(12) United States Patent
Wu (10) Patent No.: US 12,225,585 B2
(45) Date of Patent: Feb. 11, 2025

(54) WIRELESS COMMUNICATION METHOD AND TERMINAL DEVICE

(71) Applicant: GUANGDONG OPPO MOBILE TELECOMMUNICATIONS CORP., LTD., Guangdong (CN)

(72) Inventor: Zuomin Wu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 424 days.

(21) Appl. No.: 17/831,786

(22) Filed: Jun. 3, 2022

(65) Prior Publication Data

US 2022/0330342 A1 Oct. 13, 2022

Related U.S. Application Data

(63) Continuation of application No. PCT/CN2020/090451, filed on May 15, 2020.

(30) Foreign Application Priority Data

Dec. 6, 2019 (CN) .......................... 201911244523.X (51) Int. Cl.
*H04W 74/0816* (2024.01)
*H04W 72/0446* (2023.01)
(Continued)

(52) U.S. Cl.
CPC ... *H04W 74/0816* (2013.01); *H04W 72/0446* (2013.01); *H04W 72/23* (2023.01); *H04W 74/006* (2013.01); *H04W 74/0866* (2013.01)

(58) Field of Classification Search
CPC ......... H04W 74/0816; H04W 72/0446; H04W 72/23; H04W 74/006; H04W 74/0866
See application file for complete search history.

(56) References Cited

U.S. PATENT DOCUMENTS

| 2017/0238249 A1* | 8/2017 | Yoon ................... H04W 74/006 |
| | | 370/311 |
| 2019/0349815 A1* | 11/2019 | Tiirola .................. H04W 72/12 |
| 2021/0007143 A1 | 1/2021 | Zhou | |

FOREIGN PATENT DOCUMENTS

| CN | 109392176 | 2/2019 |
| CN | 110312311 | 10/2019 |

(Continued)

OTHER PUBLICATIONS

Vivo, "Discussion on the enhancements to configured grants," 3GPP TSG RAN WG1 #99, R1-1912015, Nov. 2019.

(Continued)

*Primary Examiner* — Kiet Tang
(74) *Attorney, Agent, or Firm* — Hodgson Russ LLP (57) ABSTRACT

A wireless communication method, a terminal device, and a network device, comprising: according to first downlink control information (DCI) sent by the network device, the terminal device performs at least one of determining whether uplink transmission can be performed within a channel occupancy time (COT) obtained by the network device and determining content of first COT sharing indication information comprised in configured grant uplink control information (CG-UCI), wherein the first COT sharing indication information is used to indicate whether the network device can share a COT obtained by the terminal device, and wherein a resource used in the uplink transmission is a CG uplink resource of the COT obtained by the network device.

17 Claims, 4 Drawing Sheets

(51) Int. Cl.
*H04W 72/23* (2023.01)
*H04W 74/00* (2009.01)
*H04W 74/08* (2009.01)

(56) References Cited

FOREIGN PATENT DOCUMENTS

| CN | 110351874 | 10/2019 |
|---|---|---|
| WO | 2017126935 | 7/2017 |

OTHER PUBLICATIONS

EPO, Extended European Search Report for EP Application No. 20897235.6, Oct. 26, 2022.
Sanechips ZTE, "Considerations on DL reference signals and channels design for NR-U," 3GPP TSG RAN WG1 Meeting #98bis, R1-1909972, Oct. 2019.
EPO, Office Action for EP Application No. 20897235.6, Aug. 23, 2023.
OPPO, "Channel access procedures for NR-U," 3GPP TSG RAN WG1 #98bis, R1-1910790, Oct. 2019.
WIPO, International Search Report and Written Opinion for PCT/CN2020/090451, Jul. 20, 2020.

\* cited by examiner

WIRELESS COMMUNICATION METHOD AND TERMINAL DEVICE

CROSS-REFERENCE

The present application is a continuation of International Patent Application No. PCT/CN2020/090451, filed May 15, 2020, which is claims priority to Chinese Patent Application No. 201911244523.X, filed Dec. 6, 2019, the entire disclosures of which are incorporated herein by reference.

TECHNICAL FIELD

The present disclosure relates to the field of communication technologies, and in particular, to a wireless communication method, a terminal device and a network device.

BACKGROUND

A shared spectrum is a spectrum that is available to multiple systems. For example, an unlicensed spectrum is a shared spectrum, and in order to allow various communication devices to coexist friendly in the unlicensed spectrum, some countries or regions specify regulatory requirements that must be met to use the unlicensed spectrum. For example, a Listen-Before-Talk (LBT) principle needs to be followed. That is, a User Equipment (UE) needs to perform LBT, and when the LBT is successful, the terminal obtains a Channel Occupancy (CO) for data transmission.

SUMMARY

According to various embodiments of the present disclosure, there are provided a wireless communication method, a terminal device, and a network device.

In a first aspect, there is provided a wireless communication method, including: performing, by a terminal device according to first downlink control information (DCI) sent by a network device, at least one of determining whether an uplink transmission can be performed within a channel occupancy time (COT) obtained by the network device, and determining content of first COT sharing indication information included in configured grant uplink control information (CG-UCI), wherein the first COT sharing indication information is used to indicate whether a COT obtained by the terminal device can be shared with the network device, and a resource used for the uplink transmission is a configured grant (CG) uplink resource in the COT obtained by the network device.

In a second aspect, there is provided a wireless communication method, including: sending, by a network device, first downlink control information (DCI) to a terminal device, wherein the first DCI is used by the terminal device to perform at least one of determining whether an uplink transmission can be performed within a channel occupancy time (COT) obtained by a network device, and determining content of first COT sharing indication information included in configured grant uplink control information (CG-UCI), wherein the first COT sharing indication information is used to indicate whether a COT obtained by the terminal device can be shared with the network device, and a resource used for the uplink transmission is a configured grant (CG) uplink resource in the COT obtained by the network device.

In a third aspect, there is provided a terminal device, configured to perform the method in the first aspect or any of the implementations thereof.

Specifically, the terminal device includes functional modules configured to perform the method in the first aspect or any of the implementations thereof.

In a fourth aspect, there is provided a network device, configured to perform the method in the second aspect or any of the implementations thereof.

Specifically, the network device includes functional modules configured to perform the method in the second aspect or any of the implementations thereof.

In a fifth aspect, there is provided a terminal device, including a processor and a memory. The memory is configured to store a computer program, and the processor is configured to call and run the computer program stored in the memory to perform the method in the first aspect or any of the implementations thereof.

In a sixth aspect, there is provided a network device, including a processor and a memory. The memory is configured to store a computer program, and the processor is configured to call and run the computer program stored in the memory to perform the method in the second aspect or any of the implementations thereof.

In a seventh aspect, there is provided a chip, configured to implement the method in any one of the first to second aspects or any of the implementations thereof.

Specifically, the chip includes a processor configured to call and run a computer program from a memory, to cause a device installed with the chip to perform the method in any one of the first to second aspects or any of the implementations thereof.

In an eighth aspect, there is provided a computer-readable storage medium, configured to store a computer program that causes a computer to perform the method in any one of the first to second aspects or any of the implementations thereof.

In a ninth aspect, there is provided a computer program product, including computer program instructions that cause a computer to perform the method in any one of the first to second aspects or any of the implementations thereof.

In a tenth aspect, there is provided a computer program which, when running on a computer, causes the computer to perform the method in any one of the first to second aspects or any of the implementations thereof.

Details of one or more embodiments of the present disclosure are set forth in the drawings and description below. Other features, objects and advantages of the present disclosure will become apparent from the description, drawings and claims.

BRIEF DESCRIPTION OF THE DRAWINGS

In order to more clearly describe the technical solutions in embodiments of the present disclosure or in the prior art, the following will briefly introduce the accompanying drawings required in the description of the embodiments or in the prior art. Apparently, the accompanying drawings in the following description show only some embodiments of the present disclosure, and those skilled in the art can still derive other drawings from these drawings without creative efforts.

DETAILED DESCRIPTION

In order to make objectives, technical solutions and advantages of the present disclosure clearer, embodiments of the present disclosure will be further described in detail below with reference to the drawings.

Before a data transmission method in an unlicensed spectrum provided by the embodiments of the present disclosure is introduced in detail, the terms and communication systems involved in the embodiments of the present disclosure are briefly introduced first.

Unlicensed spectrum/shared spectrum: a spectrum specified by countries and regions that is available for communication of radio devices. This spectrum is generally regarded as a shared spectrum. That is, communication devices in different communication systems can use this spectrum without applying for exclusive spectrum authority from the government, as long as they meet the regulatory requirements set by countries or regions on this spectrum.

Cat-1 LBT (also called Type 2C channel access): a LBT mode in which a communication device (a terminal or a base station) directly performs transmission without performing channel detection after a gap ends.

Cat-2 LBT: a channel access manner in which the communication device performs single-slot channel detection. Furthermore, according to different detection gaps, Cat-2 LBT can be classified into Cat-2 LBT (also called Type 2A channel access) of 25 microseconds and Cat-2 LBT (also called Type 2B channel access) of 16 microseconds.

Cat-3 LBT: a channel access manner of the communication device being multi-slot channel detection based on random back-off with a contention window of fixed size Cat-4 LBT (also called Type 1 channel access): a channel access manner of the communication device being multi-slot channel detection based on random back-off with a contention window of variable size. Exemplarily, depending on different priority classes of the transmission services, Cat-4 LBT can include different channel access priority classes. For example, refer to table 1, which shows channel access parameters corresponding to different channel access priority classes under Cat-4 LBT, where the smaller the value of p, the higher the channel access priority class.

Figure 1:
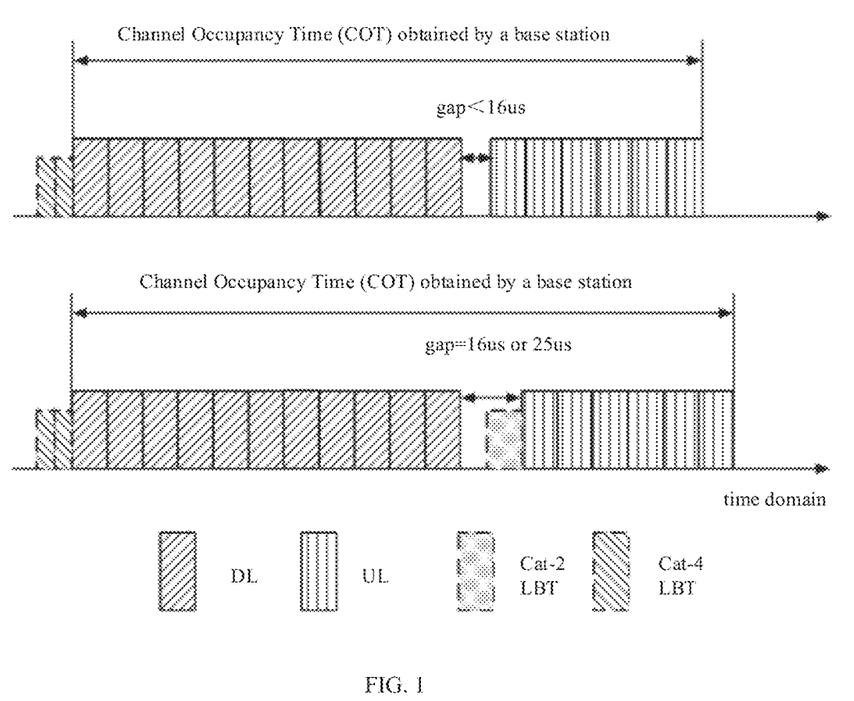
FIG. 1 is a schematic diagram of COT sharing provided by one or more exemplary embodiments of the present disclosure.

The channel access schemes in different transmission scenarios are different, and channel access schemes applied to different signals or channels are also different. FIG. 1 shows a schematic diagram of Channel Occupancy Time (COT) sharing. As shown in FIG. 1, after a network device initiates the COT using the Cat-4 LBT, the network device can share a resource in the COT with a terminal for uplink transmission. For an uplink transmission occasion occurring within the COT of the network device, if a gap between a starting position of the uplink transmission occasion and an ending position of a downlink transmission occasion is less than 16 μs, the terminal may immediately perform the uplink transmission (or Cat-1 LBT). If the gap between the starting position of the uplink transmission occasion and an ending position of the downlink transmission occasion within the COT of the network device is 16 μs or 25 μs, the terminal can perform Cat-2 LBT.

It is to be understood that a manner for the communication device to obtain the COT may be a Load Based Equipment (LBE) channel access manner, in which the communication device may perform LBT in the unlicensed spectrum after a service arrives, and start transmission of a signal after the LBT is successful, or a Frame Based Equipment (FBE) channel access manner, in which the communication device periodically performs LBT in the unlicensed spectrum.

If the LBE-based channel access manner is adopted, the network device or the terminal device may obtain the COT through Cat-4 LBT. Cat-4 LBT may refer to that a channel detection manner of a communication device is a multi-slot channel detection based on random back-off with a contention window of variable size. Specifically, depending on priorities of the transmission services, Cat-4 LBT may include different Channel Access Priority Classes (CAPCs). Tables 1 and 2 are two examples of channel access parameters corresponding to different Channel Access Priority Classes (CAPCs) under Cat-4 LBT. The smaller a value of p, the higher the channel access priority class. Optionally, table 1 is used for channel access of the network device, and table 2 is used for channel access of the terminal.

TABLE 1

| Channel Access Priority Class | m | $CW_{min}$ | $CW_{max}$ | $T_{mcot}$ | allowed CW values |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

| Channel Access Priority Class | m | $CW_{min}$ | $CW_{max}$ | $T_{mcot}$ | allowed CW values |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

It should be noted that in the above tables 1 and 2, m refers to a number of back-off slots corresponding to the channel access priority class, CW refers to size of a contention window corresponding to the channel access priority class, $CW_{min}$ refers to a minimum value of CW corresponding to the channel access priority class, $CW_{max}$ refers to a maximum value of CW corresponding to the channel access priority class, and $T_{mcot}$ refers to a maximum channel occupancy time duration corresponding to the channel access priority class p. It should be understood that tables 1 and 2 are only examples, and the channel access parameters in different channel access priority classes may also have other values.

Figure 2:
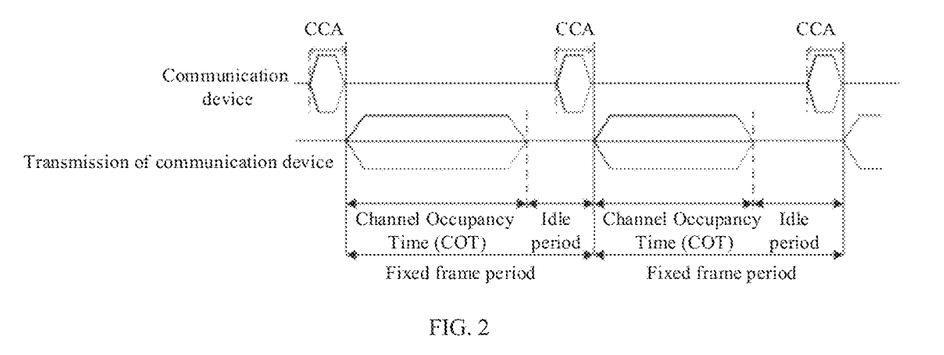
FIG. 2 is a schematic diagram of a fixed frame period provided by one or more exemplary embodiments of the present disclosure.

When the FBE-based channel access manner is adopted, as shown in FIG. 2, in this manner, frame structures occur periodically. A frame structure includes a fixed frame period (a length of which does not exceed a preset value, such as 10 ms), a COT (a length of which does not exceed 95% of the fixed frame period) and idle time (a length of which is at least 5% of the COT, with a minimum of 100 us, and located at the end of the fixed frame period). The network device or the terminal device performs LBT (for example, single-slot channel detection) on the unlicensed spectrum in the idle time. If the LBT succeeds, a COT in a next fixed frame period may be used for signal transmission. If LBT fails, the COT in the next fixed frame period cannot be used for signal transmission. In other words, the channel resources available for service transmission by the communication device occur periodically.

Hereinafter, a communication system involved in the embodiments of the present disclosure will be briefly introduced.

The technical solutions according to the embodiments of the present disclosure can be applied to various communication systems compatible with the unlicensed spectrum, for example, a Long Term Evolution (LTE) system, a LTE Frequency Division Duplex (FDD) system, a LTE Time Division Duplex (TDD) system, an advanced LTE (LTE-A) system, New Radio (NR) system, a evolution system of NR system, a LTE-based access to unlicensed spectrum (LTE-U) system, a NR-based access to unlicensed spectrum (NR-U) system, a Universal Mobile Telecommunication System (UMTS), a Worldwide Interoperability for Microwave Access (WiMAX) communication system, a wireless local area network (WLAN), a wireless fidelity (Wi-Fi), a next-generation communication system or other communication systems. The embodiments of the present disclosure take the NR-U system as an example of the communication system for illustration.

Generally speaking, traditional communication systems support a limited number of connections and are easy to implement. However, with the development of communication technologies, mobile communication systems will not only support traditional communication, but also support, for example, device to device (D2D) communication, machine-to-machine (M2M) communication, machine-type communication (MTC), vehicle-to-vehicle (V2V) communication, and so on. Embodiments of the present disclosure can also be applied to these communication systems.

A system architecture and service scenario described in embodiments of the present disclosure are used for describing the technical solutions in embodiments of the disclosure more clearly and not intended to limit the technical solutions provided in embodiments of the disclosure. Those of ordinary skill in the art should know that, with the evolution of network architectures and emergence of new service scenarios, the technical solutions provided in embodiments of the disclosure are also applicable to similar technical problems.

Figure 3:
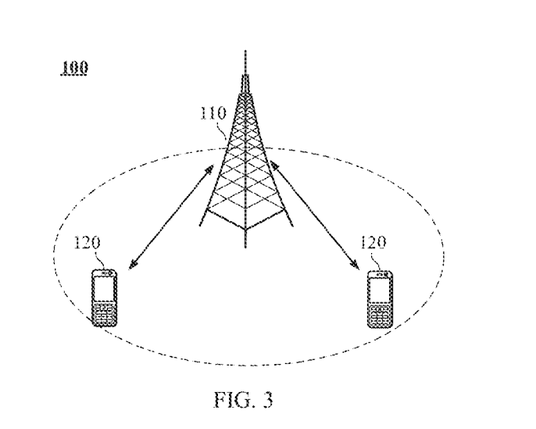
FIG. 3 is a schematic diagram of a communication system provided by one or more exemplary embodiments of the present disclosure.

Exemplarily, a communication system 100 applied in an embodiment of the present disclosure is shown in FIG. 3. The communication system 100 may include a network device 110. The network device 110 may be a device in communication with a terminal device 120 (or referred to as a communication terminal or a terminal). The network device 110 may provide communication coverage for a specific geographic region, and may communicate with the terminal located within the coverage region. Optionally, the network device 110 may be an evolutional node B (eNB or eNodeB) in a long term evolution (LTE) system, or a radio controller in a cloud radio access network (CRAN). Alternatively, the network device may be a mobile switching center, a relay station, an access point, a vehicle device, a wearable device, a concentrator, a switchboard, a network bridge, a router, a network device in a 5th generation (5G) network, a network device in a future communication system, or the like.

The communication system 100 further includes at least one terminal device 120 located within a coverage range of the network device 110. As used herein, the term "terminal" includes, but is not limited to, a device which communicates via a wired line connection, such as a public switched telephone networks (PSTN), a digital subscriber line (DSL), a digital cable, and a direct cable connection; via another data connection/network; via a wireless interface, such as those for a cellular network, a wireless local area network (WLAN), a digital TV network such as a DVB-H network, a satellite network or an AM-FM broadcast transmitter; via a device of another terminal that is configured to receive/send communication signals; and/or an Internet of Things (IoT) device. The terminal that is configured to communicate through a wireless interface may be referred to as a "wireless communication terminal", a "wireless terminal" or a "mobile terminal". Examples of the mobile terminal include but are not limited to a satellite or cellular phone; a Personal Communications System (PCS) terminal that can combine cellular radio phones with data processing, fax, and data communication capabilities; a PDA that may include radio phones, pagers, Internet/intranet access, a Web browser, a memo pad, a calendar, and/or a Global Positioning System (GPS) receiver; and conventional laptop and/or palmtop receivers or other electronic devices including radio telephone transceivers. The terminal may refer to an access terminal, user equipment (UE), a user unit, a user station, a mobile station, a mobile console, a remote station, a remote terminal, a mobile device, a user terminal, a terminal, a wireless communication device, a user agent, or a user device. The access terminal may be a cellular phone, a cordless phone, a Session Initiation Protocol (SIP) phone, a wireless local loop (WLL) station, a personal digital assistant (PDA), and a handheld device with wireless communication function, a computing device or other processing devices connected to wireless modems, in-vehicle devices, wearable devices, terminals in 5G networks, terminals in the future evolution of PLMN, or the like.

Optionally, the downlink channel in the embodiments of the present disclosure may include a Physical Downlink Control Channel (PDCCH), an Enhanced Physical Downlink Control Channel (EPDCCH), a Physical Downlink Shared Channel (PDSCH), a Physical Hybrid ARQ Indicator Channel (PHICH), a Physical Multicast Channel (PMCH), a Physical Broadcast Channel (PBCH), and so on. The downlink signal may include a downlink Synchronization Signal, a Phase Tracking Reference Signal (PT-RS), a downlink DeModulation Reference Signal (DMRS), a Channel State Information-Reference Signal (CSI-RS), etc. The downlink Synchronization Signal may be used for network accessing and radio resource management and measurement by the communication device, the downlink DMRS may be used for demodulation of a downlink channel, the CSI-RS may be used for downlink channel measurement, downlink time-frequency synchronization or phase tracking, and the PT-RS may also be used for downlink channel measurement, downlink time-frequency synchronization or phase tracking. It should be understood that the embodiments of the present disclosure may include downlink physical channels or downlink reference signals with the same names as and different functions from those described above, and may also include downlink physical channels or downlink reference signals with different names from and the same functions as those described above, which is not limited by the present disclosure.

Optionally, the uplink channel in an embodiment of the present disclosure may include a Physical Random Access Channel (PRACH), a Physical Uplink Control channel (PUCCH), and a Physical Uplink Shared channel (PUSCH), etc. The uplink signal may include an uplink DeModulation Reference Signal (DMRS), a sounding reference signal (SRS), a Phase Tracking Reference Signal (PT-RS), and so on. The uplink DMRS may be used for demodulation of the uplink channel, the SRS may be used for measurement of the uplink channel, uplink time-frequency synchronization, or phase tracking, and the PT-RS may also be used for uplink channel measurement, uplink time-frequency synchronization or phase tracking. It should be understood that the embodiments of the present disclosure may include uplink physical channels or uplink reference signals with the same names as and different functions from those described above, or may also include uplink physical channels or uplink reference signals with different names from and same functions as those described above, which is not limited by the present disclosure.

Optionally, device to device (D2D) communication may be performed between the terminal devices 120.

Optionally, a 5G communication system or 5G network may also be referred to as a new radio (NR) system or NR network.

FIG. 3 exemplarily illustrates one network device and two terminals. Optionally, the communication system 100 may include a plurality of network devices, and other numbers of terminals may be included within the coverage area of each network device, which is not limited by embodiments of the present disclosure.

Optionally, the communication system 100 may further include other network entities such as a network controller and a mobility management entity, which is not limited by embodiments of the present disclosure.

It is to be understood that a device with a communication function in the network/system in embodiments of the present disclosure may be called a communication device. For example, for the communication system 100 shown in FIG. 3, the communication device may include the network device 110 and the terminal devices 120 which have the communication function, and the network device 110 and the terminal devices 120 may be the specific devices as mentioned above, which will not be repeated herein. The communication devices may further include other devices in the communication system 100, for example, other network entities such as a network controller and a mobility management entity, which is not limited by embodiments of the present disclosure.

Figure 4:
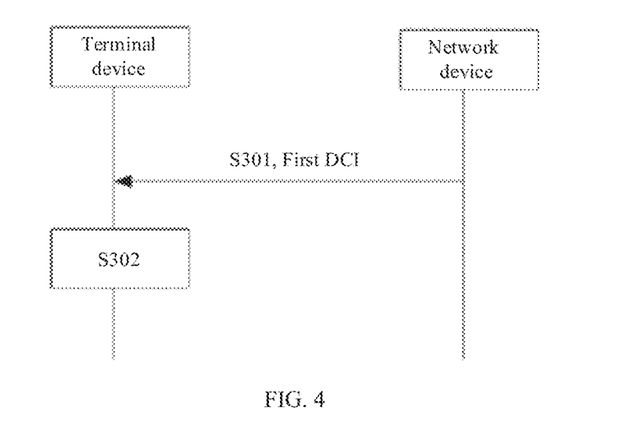
FIG. 4 is a flowchart of a wireless communication method provided by one or more embodiments of the present disclosure.

FIG. 4 is a flowchart showing a wireless communication method according to an exemplary embodiment of the present disclosure. The method can be applied to the communication system shown in FIG. 3 above, and the method can include at least part of the following contents.

In S301, a terminal device receives first downlink control information (DCI) sent by a network device.

In S302, the terminal device performs, according to the first DCI sent by the network device, at least one of determining whether an uplink transmission can be performed within a channel occupancy time (COT) obtained by the network device, and determining content of first COT sharing indication information included in configured grant uplink control information (CG-UCI), where the first COT sharing indication information is used to indicate whether a COT obtained by the terminal device can be shared with the network device, and a resource used for the uplink transmission is a configured grant (CG) uplink resource in the COT obtained by the network device.

Optionally, in some embodiments, the S302 may include:
when the first DCI indicates that the first CG uplink resource in the COT of the network device can be shared with the terminal device for transmitting a first CG-PUSCH, or in other words, the CG uplink resource in the COT of the network device is available, the terminal device performs at least one of the following:
the terminal device transmits the first CG-PUSCH on the first CG uplink resource, where the first CG-PUSCH includes the first CG-UCI, and the first COT sharing indication information in the first CG-UCI indicates that the COT obtained by the terminal device cannot be shared with the network device;
the terminal device transmits the first CG-PUSCH on the first CG uplink resource, where the first CG-PUSCH includes the first CG-UCI, and the first CG-UCI does not include the first COT sharing indication information, indicating that the COT obtained by the terminal device cannot be shared with the network device;
the terminal device transmits the first CG-PUSCH on the first CG uplink resource, and the COT obtained by the terminal device cannot be shared with the network device, or in other words, the network device determines that the COT cannot be shared and does not need to determine whether the COT can be shared according to the first CG-UCI included in the first CG-PUSCH;
when the terminal device is configured with a sharing energy detection threshold, the terminal device transmits the first CG-PUSCH on the first CG uplink resource, where the first CG-PUSCH includes the first CG-UCI, the first COT sharing indication information in the first CG-UCI indicates that the COT obtained by the terminal device cannot be shared with the network device, and the first COT sharing indication information includes at least one bit; and
when the terminal device is not configured with the sharing energy detection threshold, the terminal device transmits the first CG-PUSCH on the first CG uplink resource, where the first CG-PUSCH includes the first CG-UCI, the first COT sharing indication information in the first CG-UCI indicates that the COT obtained by the terminal device cannot be shared with the network device, and the first COT sharing indication information includes one bit.

It should be understood that the LBE-based channel access manner may correspond to dynamic channel access or dynamic channel occupancy, and the FBE-based channel access manner may correspond to semi-static channel access or semi-static channel occupancy. If the network or a device in the network is configured with the semi-static channel access manner, for example, provided with configuration information ChannelAccessMode-r16='semistatic', the channel access manner of the network or the device in the network is the semi-static channel access. It can be assumed that the channel access manner of the network or the device in the network is the dynamic channel access by default. In the semi-static channel access system, the terminal device is not allowed to use Cat-4 LBT to initiate COT at present, and accordingly, the terminal device should not be allowed to share a resource with the network device.

Optionally, the first CG-UCI not including the first COT sharing indication information includes that if the terminal device corresponds to the semi-static channel access manner, the first CG-UCI does not include the first COT sharing indication information. For example, if the terminal device is provided with the configuration information ChannelAccessMode-r16='semistatic', the first CG-UCI does not include the first COT sharing indication information.

Optionally, if the terminal device corresponds to the semi-static channel access manner, the terminal device satisfies at least one of the following conditions: the terminal device does not expect to be configured to include the COT sharing indication information in the CG-UCI, the terminal device does not expect to be configured with the sharing energy detection threshold, the terminal device does not expect to be configured with the COT sharing indication information, and the terminal device expects that the CG-UCI does not include the COT sharing indication information.

Optionally, if the CG-UCI includes the COT sharing indication information, the terminal device corresponds to the dynamic channel access manner.

Optionally, in a case where the terminal device corresponds to the dynamic channel access manner, the CG-UCI may or may not include the COT sharing indication information; otherwise, the CG-UCI does not include the COT sharing indication information.

Optionally, the terminal device corresponding to the semi-static channel access manner includes that at least one of a system to which the terminal device belongs, a network device corresponding to the terminal device, and the terminal device is configured with the semi-static channel access manner.

Optionally, the terminal device corresponding to the dynamic channel access manner includes that at least one of the system to which the terminal device belongs, the network device corresponding to the terminal device, and the terminal device is not configured with the semi-static channel access manner.

The terminal device transmits the first CG-PUSCH on the first CG uplink resource, the first CG-PUSCH includes the first CG-UCI, and the first COT sharing indication information in the first CG-UCI indicates that the COT obtained by the terminal device can be shared with the network device. In the COT of the terminal device, a time duration for the network device to transmit a downlink signal or channel is less than or equal to a first duration, and/or, the downlink signal or channel transmitted by the network device does not include user-plane data of the terminal device.

Optionally, the sharing energy detection threshold may be configured by the network device through a RRC parameter, and/or preset in a standard, and/or determined by the network device according to its maximum transmission power. Optionally, the sharing energy detection threshold may be used by the terminal device for channel detection.

Optionally, the sharing energy detection threshold is a corresponding maximum energy detection threshold used when the terminal device shares its channel occupancy with the network device for transmission of the downlink signal or channel.

Optionally, the first DCI may be, for example, a DCI in DCI format 2-0.

Figure 5:
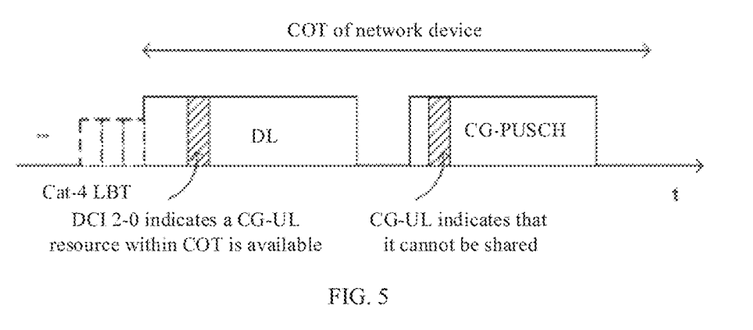
FIG. 5 is a schematic diagram of a wireless communication method according to one or more embodiments of the present disclosure.

For example, as shown in FIG. 5, the first DCI may be the DCI in DCI format 2-0, and the first DCI is used to indicate that the CG uplink resource in the COT of the network device is available, and then the terminal device can transmit the first CG-PUSCH on the first CG uplink resource. The first CG-PUSCH includes the first CG-UCI, and the first COT sharing indication information in the first CG-UCI indicates that the COT obtained by the terminal device cannot be shared with the network device.

Optionally, in some other embodiments, if the first CG uplink resource of the terminal device is located in the COT obtained by the network device, in this case, if the terminal device receives the first downlink control information (DCI) sent by the network device, such as the DCI in DCI format 2-0, and the first DCI indicates that the first CG uplink resource in the COT of the network device cannot be shared with the terminal device for transmission of the first CG-PUSCH (or in other words, the CG uplink resource in the COT of the network device is unavailable), a behavior of the terminal device includes: the terminal device does not transmit the CG-PUSCH on the first CG uplink resource.

Figure 6:
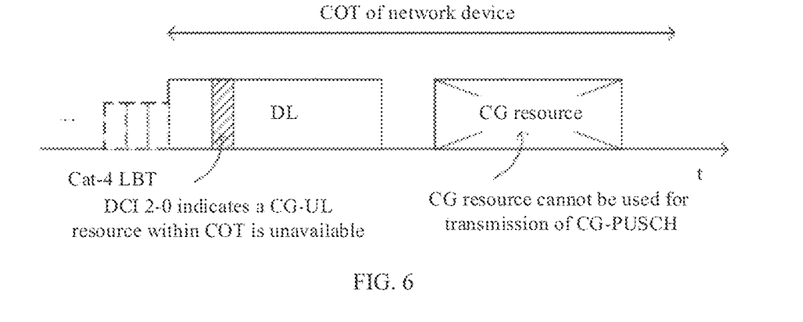
FIG. 6 is a schematic diagram of a wireless communication method according to one or more embodiments of the present disclosure.

For example, as shown in FIG. 6, the first DCI may be the DCI in DCI format 2-0, the first DCI is used to indicate that the CG uplink resource in the COT of the network device is unavailable, and the terminal device does not transmit the CG-PUSCH on the first CG uplink resource.

That is, when the first DCI indicates that the terminal device cannot share the first CG uplink resource in the COT of the network device to transmit the CG-PUSCH, the terminal device does not transmit the CG-PUSCH on the first CG uplink resource.

Optionally, the terminal device determines the number L of bits of the first COT sharing indication information included in the Configured Grant Uplink Control Information (CG-UCI) according to N lines of COT sharing indication information configured by the network device. Specifically, the number L of bits of the first COT sharing indication information included in the CG-UCI is ceil(log2 (N)), where ceil( ) represents a round-up function, and log2 represents a base-2 logarithm. For example, when a value of N is 4, L=2, and when the number of N is 10, L=4.

Optionally, when values of the L bits are all "0" or "1", it indicates that the COT obtained by the terminal device cannot be shared with the network device. Optionally, the number L of bits of the first COT sharing indication information included in the CG-UCI is one. Specifically, when the one bit indicates "1", it indicates that the network device can share the COT of the terminal device, and when the one bit indicates "0", it indicates that the network device cannot share the COT of the terminal device.

Optionally, in some embodiments, the first DCI includes second COT sharing indication information, and the second COT sharing indication information is used to determine whether the terminal device is allowed to share the first configured grant (CG) uplink resource in the COT obtained by the network device to transmit the CG-PUSCH; and/or, the first DCI includes slot format indication (SFI) information, and the SFI information is used to determine whether the terminal device is allowed to share the first configured grant (CG) uplink resource in the COT obtained by the network device to transmit the CG-PUSCH.

Optionally, as an example, the SFI information being used to determine whether the terminal device is allowed to share the first configured grant (CG) uplink resource in the COT obtained by the network device to transmit the configured grant physical uplink shared channel (CG-PUSCH) includes:

when the slot format indication information in the first DCI indicates that a symbol corresponding to the first CG uplink resource is an uplink symbol, it indicates that the terminal device can share the first CG uplink resource in the COT of the network device to transmit the first CG-PUSCH; or when the slot format indication information in the first DCI indicates that the symbol corresponding to the first CG uplink resource is not the uplink symbol, it indicates that the terminal device cannot share the first CG uplink resource in the COT of the network device to transmit the first CG-PUSCH Further, the method also includes:

when the second COT sharing indication information is configured by the network device for the terminal device, the second COT sharing indication information is used to determine whether the uplink resource in the COT of the network device can be shared for the uplink transmission; or when the network device does not configure the second COT sharing indication information for the terminal device, the SFI indication information is used to determine whether the uplink resource in the COT of the network device can be shared for the uplink transmission.

That is, when the terminal device is configured with a separate information field, the terminal device determines whether it can share the first CG uplink resource in the COT of the network device to transmit the first CG-PUSCH according to the indication of the separate information field. Alternatively, when the terminal device is not configured with the separate information field, the terminal device determines whether it can share the first CG uplink resource in the COT of the network device to transmit the first CG-PUSCH according to the SFI information.

Optionally, the terminal device may also reuse another information field in the first DCI to indicate whether the terminal device can share the first CG uplink resource in the COT obtained by the network device to transmit the first CG-PUSCH. For example, when the other information field is of a first value, it indicates that the terminal device can share the first CG uplink resource in the COT obtained by the network device to transmit the first CG-PUSCH, and when the other information field is of a second value, it indicates that the terminal device cannot share the first CG uplink resource in the COT obtained by the network device to transmit the first CG-PUSCH, and the present disclosure is not limited to this.

Correspondingly, for the network device, in some cases, when the first DCI indicates that the terminal device can share the first CG uplink resource in the COT of the network device to transmit the first CG-PUSCH, the network device receives the first CG-PUSCH transmitted on the first CG uplink resource by the terminal device. The first CG-PUSCH includes the first CG-UCI, and the first COT sharing indication information in the first CG-UCI is used to indicate whether the COT obtained by the terminal device is shared with the network device.

In some other cases, when the first DCI indicates that the terminal device cannot share the first CG uplink resource in the COT of the network device to transmit the CG-PUSCH, the network device does not receive the CG-PUSCH on the first CG uplink resource.

It should be understood that the COT obtained by the terminal device through Cat-4 LBT can also be shared with the network device. The present disclosure also provides a method for sharing the COT obtained by the terminal device with the network device for downlink transmission, which includes at least part of the following contents.

It should be understood that solutions in the following embodiments may be implemented independently, or may also be implemented in combination with the foregoing embodiments, which are not limited in the embodiments of the present disclosure.

The terminal device obtains the channel occupancy time (COT), which includes at least a first time domain resource and a second time domain resource, the first time domain resource belongs to a first transmission occasion, the second time domain resource is located after the first time domain in the time domain, and the second time domain resource can be used by the network device to send the downlink transmission.

The terminal device sends the CG-PUSCH to the network device through the first time domain resource. The CG-PUSCH includes the CG-UCI, the CG-UCI includes the COT sharing indication information, and the COT sharing indication information is used to indicate whether the network device can share the COT obtained by the terminal device.

In an example, the second time domain resource belongs to a second transmission occasion, but this is not limited in the present disclosure.

Optionally, obtaining the COT may refer to obtaining the COT by the terminal device, and correspondingly, it is at least one of the following: the first transmission occasion is the uplink transmission occasion and the second transmission occasion is the downlink transmission occasion. Optionally, the second transmission occasion includes a downlink signal or a downlink channel sent to the terminal device.

In an example, the second time domain resource may be used by the network device to send a target downlink transmission.

Optionally, obtaining the COT may refer to obtaining the COT by the network device, and correspondingly, the network device satisfies at least one of the following: the first transmission occasion is the downlink transmission occasion and the second transmission occasion is the uplink transmission occasion.

In an example, the second time domain resource may be used by the terminal device to send a target uplink transmission.

The downlink transmission occasion may refer to a group of downlink transmissions performed by the network device (that is, including one or more downlink transmissions), the downlink transmissions in the group are continuous transmissions (that is, there are no gaps between the multiple downlink transmissions), or there is a gap in the group of downlink transmissions but the gap is less than or equal to a certain duration (e.g., 16 µs). If a gap between two downlink transmissions by the network device is greater than the certain duration (e.g., 16 µs), the two downlink transmissions can be considered as belonging to two downlink transmission occasions.

The uplink transmission occasion may refer to a group of uplink transmissions performed by one UE (that is, including one or more uplink transmissions), the uplink transmissions in the group are continuous transmissions (that is, there are no gaps between the multiple uplink transmissions), or there is a gap in the group of uplink transmissions but the gap is less than or equal to a certain duration (e.g., 16 µs). If a gap between two uplink transmissions performed by the UE is greater than the certain duration (e.g., 16 µs), the two uplink transmissions can be considered as belonging to two uplink transmission occasions.

COT refers to a time length during which data transmission can be performed using a channel of the unlicensed spectrum after the successful LBT. The data transmissions within a COT may be discontinuous. As an example, a maximum value of one COT cannot exceed 20 ms.

In the embodiments of the present disclosure, an example in which the terminal device obtains the COT and shares the obtained COT with the network device is taken for illustration, and an implementation in which the network device obtains the COT and share the obtained COT with the terminal device is similar, and will not be repeated here.

Optionally, the terminal device may be provided with the sharing energy detection threshold. Optionally, the sharing energy detection threshold may be used by the terminal device for channel detection.

Optionally, if the terminal device uses the sharing energy detection threshold, when the terminal device shares its obtained channel occupancy time with the network device for transmission of the downlink signal or channel, a time length in the COT of the terminal device during which the network device transmits the downlink signal or channel can be longer than a first length.

Optionally, if the terminal device does not use the sharing energy detection threshold or the terminal device is not configured with the sharing energy detection threshold, when the terminal device shares the obtained channel occupancy with the network device for transmission of the downlink signal or channel, the time length in the COT of the terminal device during which the network device transmits the downlink signal or channel is shorter than or equal to the first length, and the downlink signal or channel transmitted by the network device does not include the user-plane data of the terminal device.

Optionally, if a subcarrier spacing of the channel is 15 kHz, the first length is two symbols.

Optionally, if the subcarrier spacing of the channel is 30 kHz, the first length is four symbols.

Optionally, if the subcarrier spacing of the channel is 60 kHz, the first length is eight symbols.

In an embodiment, if the terminal device is provided with the sharing energy detection threshold, the terminal device performs the channel detection according to the sharing energy detection threshold and obtains the COT.

In an embodiment, if the terminal device is not provided with the sharing energy detection threshold, the terminal device performs the channel detection according to the transmission power of the terminal device and obtains the COT.

In an embodiment, after the first transmission occasion ends, the network device may start the transmission of the second transmission occasion after a gap less than or equal to a first certain duration (e.g., 16 µs) ends, in other words, the network device may use Cat-1 LBT to perform the transmission of the second transmission occasion. The second transmission occasion only includes the transmission of a control signal or channel, or the transmission of a broadcast signal or channel. In other words, the second transmission occasion does not include the user-plane data of the terminal device.

In an embodiment, after the first transmission occasion ends, the network device may start the transmission of the second transmission occasion after the gap less than or equal to the first certain duration (e.g., 16 µs) ends, in other words, the network device may use Cat-1 LBT to perform the transmission of the second transmission occasion. A length of the second transmission occasion is less than or equal to a second length. Optionally, the second transmission occasion may include the user-plane data of the terminal device.

In an embodiment, after the first transmission occasion ends, the network device may perform the transmission of the second transmission occasion after Cat-2 LBT (or Type 2B channel access) used within the gap equal to the first certain duration (e.g., 16 µs) is successful.

In an embodiment, after the first transmission occasion ends, the network device may perform the transmission of the second transmission occasion after Cat-2 LBT (or Type 2A channel access) used within a gap equal to a second certain duration (e.g., 25 µs) is successful.

Optionally, the second length is 584 µs.

Optionally, the first certain duration is 16 µs.

Optionally, the second certain duration is 25 µs.

Optionally, the terminal device may be configured with the Configured Grant (CG) uplink resource, and the CG uplink resource may be used for the Configured Grant uplink transmission, such as the transmission of the CG-PUSCH. If the terminal device performs the transmission on the CG uplink resource, the terminal device can determine whether to share the COT obtained in this situation with the network device.

In an embodiment, if the terminal device is provided with the sharing energy detection threshold, the terminal device can be configured with N lines of COT sharing indication information by the network device through a RRC parameter, where N is a positive integer greater than or equal to 1. The N lines of COT sharing indication information include at least one of the following cases where:

at least one of the N lines of COT sharing indication information is used to indicate that the COT obtained by the terminal device cannot be shared with the network device;

at least one of the N lines of COT sharing indication information is used to indicate at least one of the following parameters: a CAPC value P, a first offset value, and a third length.

Optionally, the CAPC value P, the first offset value, and the third length are indicated by means of joint coding.

Optionally, the CAPC value P is a CAPC value used when the terminal device obtains the COT; and/or the CAPC value P represents that when the network device shares the COT of the terminal device, it should be guaranteed that a CAPC priority corresponding to a downlink transmission service in the COT is higher than or equal to the CAPC value P. For example, the CAPC value corresponding to the downlink transmission service to be transmitted by the network device in the COT is P1, and if P1 is less than or equal to P, the network device can share the COT of the terminal device; or, if P1 is greater than P, the network device cannot share the COT of the terminal device.

Optionally, the first offset value is used to indicate the number of slots from a slot when the CG-UCI is received to a first slot that can be shared by the network device.

Optionally, the third length is used to indicate the number of slots that can be shared by network devices in the COT.

Optionally, if the terminal device is provided with a sharing energy detection threshold, the terminal device determines the number L of bits of the first COT sharing indication information included in the Configured Grant Uplink Control Information (CG-UCI) according to N lines of COT sharing indication information configured by the network device. Specifically, the number L of bits of the first COT sharing indication information included in the CG-UCI is ceil(log2(N)), where ceil( ) represents a round-up function, and log2 represents a base-2 logarithm. For example, when N is of a value of 4, L=2, and when N is of a value of 10, L=4.

Optionally, when values of the L bits are all "0" or "1", it indicates that the COT obtained by the terminal device cannot be shared with the network device.

Optionally, if the terminal device is not provided with the sharing energy detection threshold, the number L of bits of the first COT sharing indication information included in the CG-UCI is one. Specifically, when the one bit indicates "1", it indicates that the network device can start to share the COT of the terminal device after a second offset value has passed since an end position of a slot in which the CG-UCI is received. Optionally, the time length in the COT of the terminal device during which the network device transmits the downlink signal or channel is shorter than or equal to the first length, and the downlink signal or channel transmitted by the network device does not include the user-plane data of the terminal device. Optionally, the time length in the COT of the terminal device during which the network device transmits the downlink signal or channel is shorter than or equal to a fourth length, and the downlink signal or channel transmitted by the network device does not include the user-plane data of the terminal device, and the fourth length is determined according to the first length.

Optionally, the second offset value is configured by the network device through the RRC parameter.

Optionally, the second offset value includes an integer number of symbols, and the integer number is greater than or equal to zero.

Optionally, if the terminal device is configured with multiple Configured Grant (CG) uplink resource configurations, at least two Configured Grant (CG) uplink resource configurations in the multiple Configured Grant (CG) uplink resource configurations correspond to the same second offset value.

Optionally, if the terminal device is configured with the multiple Configured Grant (CG) uplink resource configurations, the multiple Configured Grant (CG) uplink resource configurations correspond to the same second offset value.

Optionally, if the terminal device is configured with the multiple Configured Grant (CG) uplink resource configurations, each of the multiple Configured Grant (CG) uplink resource configurations corresponds to one second offset value.

Optionally, the second offset value is configured according to at least one of the following parameters: a configuration parameter of a downlink control channel PDCCH, a processing delay of the network device, the number of CG-PUSCHs included in each slot, the number of slots that include the CG-PUSCH resource in one period, and a minimum DFI feedback delay.

Optionally, the configuration parameter of the PDCCH include at least one of the following: a monitoring period of the PDCCH, a search space set corresponding to the PDCCH, a control resource position CORESET corresponding to the PDCCH, and a group of search space sets corresponding to the PDCCH.

In an embodiment, the second offset value is configured by the number of CG-PUSCHs included in each slot, and the number of CG-PUSCHs included in each slot is one of the following: 1, 2, 3, 4, 5, 6, and 7.

In an embodiment, the number of symbols included in each CG-PUSCH in one type of the CG resource configuration is the same, and the number of symbols included in each CG-PUSCH can be determined according to the number of CG-PUSCHs included in each slot. Further, the second offset value is determined according to the number of symbols included in each CG-PUSCH.

For example, when the number of CG-PUSCH included in each slot is one of 1, 2, and 7, the value of the second offset value can be one of the following values: m*14, and m*14+1, where m is an integer greater than or equal to 0.

Optionally, the fourth length is determined according to at least one of the following parameters: the number of CG-PUSCHs included in each slot, the number of slots that include the CG-PUSCH resource in one period, the number of symbols included in each CG-PUSCH, the number of symbols that cannot be used for CG-PUSCH transmission in each slot, and the configuration parameter of the PDCCH.

In an embodiment, the number of symbols included in each CG-PUSCH in one type of the CG resource configuration is the same, and the number of symbols that cannot be used for CG-PUSCH transmission in each slot can be determined to be S according to the number of CG-PUSCHs included in each slot. Further, the fourth length=first length−S.

Optionally, if the subcarrier spacing is 15 kHz, the fourth length=(2−S) symbols.

Optionally, if the subcarrier spacing is 30 kHz, the fourth length=(4−S) symbols.

Optionally, if the subcarrier spacing is 60 kHz, the fourth length=(8−S) symbols.

For example, when the number of CG-PUSCHs included in each slot is 3, the number of symbols included in each CG-PUSCH is 4, and the number S of symbols that cannot be used for CG-PUSCH transmission in each slot is 14−3*4=2, and thus, if the subcarrier spacing is 15 kHz, the fourth length=(2−2)=0 symbols, that is, the network device cannot share the COT of the terminal device.

If the subcarrier spacing is 30 kHz, the fourth length=(4−2)=2 symbols, and the time length in the COT of the terminal device during which the network device transmits the downlink signal or channel is shorter than or equal to two symbols.

If the subcarrier spacing is 60 kHz, the fourth length=(8−2)=6 symbols, and the time length in the COT of the terminal device during which the network device transmits the downlink signal or channel is shorter than or equal to six symbols.

To sum up, in the methods provided by the embodiments of the present disclosure, the network device can configure the COT sharing indication information for the terminal device, so that the terminal device can determine whether the COT obtained by the network device can be shared according to the COT sharing indication information when the configured grant uplink resource is within the COT obtained by the network device, and can also indicate to the network device whether the COT obtained by the terminal device can be shared, which is beneficial to improve a utilization rate of the unlicensed spectrum.

It should be understood that the solutions in the foregoing embodiments may be implemented independently, or may also be implemented in combination, which are not limited in the embodiments of the present disclosure.

The method embodiments of the present disclosure are described in detail above with reference to FIGS. 4 to 6, and apparatus embodiments of the present disclosure are described in detail below with reference to FIGS. 7 to 11. It should be understood that the apparatus embodiments and the method embodiments correspond to each other, and similar descriptions can be made with reference to the method embodiments.

Figure 7:
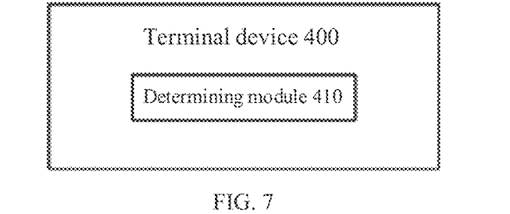
FIG. 7 is a schematic structural diagram of a terminal device according to one or more embodiments of the present disclosure.

FIG. 7 shows a schematic block diagram of a terminal device 400 according to an embodiment of the present disclosure. As shown in FIG. 7, the terminal device 400 includes:

a determining module 410, configure to perform, by a terminal device according to first downlink control information (DCI) sent by a network device, at least one of determining whether an uplink transmission can be performed within a channel occupancy time (COT) obtained by the network device, and determining content of first COT sharing indication information included in configured grant uplink control information (CG-UCI), where the first COT sharing indication information is used to indicate whether a COT obtained by the terminal device can be shared with the network device, and a resource used for the uplink transmission is a configured grant (CG) uplink resource in the COT obtained by the network device.

Optionally, in some embodiments, the terminal device further includes:

a communication module, configured to perform at least one of the following in a case where the first DCI indicates that a first CG uplink resource in the COT of the network device can be shared with the terminal device for transmitting a first CG-PUSCH:

when the first DCI indicates that the first CG uplink resource in the COT of the network device can be shared with the terminal device for transmitting a first CG-PUSCH, performing, by the terminal device, at least one of the following:

transmitting the first CG-PUSCH on the first CG uplink resource, where the first CG-PUSCH includes first CG-UCI, and the first COT sharing indication information in the first CG-UCI indicates that the COT obtained by the terminal device cannot be shared with the network device;

transmitting the first CG-PUSCH on the first CG uplink resource, where the first CG-PUSCH includes the first CG-UCI, and the first CG-UCI does not include the first COT sharing indication information, which indicates that the COT obtained by the terminal device cannot be shared with the network device;

transmitting the first CG-PUSCH on the first CG uplink resource, where the COT obtained by the terminal device cannot be shared with the network device;

when the terminal device is configured with a sharing energy detection threshold, transmitting the first CG-PUSCH on the first CG uplink resource, where the first CG-PUSCH includes the first CG-UCI, the first COT sharing indication information in the first CG-UCI indicates that the COT obtained by the terminal device cannot be shared with the network device, and the first COT sharing indication information includes at least one bit; and when the terminal device is not configured with the sharing energy detection threshold, transmitting the first CG-PUSCH on the first CG uplink resource, where the first CG-PUSCH includes the first CG-UCI, the first COT sharing indication information in the first CG-UCI indicates that the COT obtained by the terminal device cannot be shared with the network device, and the first COT sharing indication information includes one bit.

Optionally, in some embodiments, the first COT sharing indication information in the first CG-UCI includes at least one bit, and all of the at least one bit being of a value of 0 indicates that the COT obtained by the terminal device cannot be shared with the network device.

Optionally, in some embodiments, when the terminal device is not configured with the sharing energy detection threshold, the first COT sharing indication information includes one bit, and the one bit is set to 0.

Optionally, in some embodiments, the determining module is further configured to:

when the first DCI indicates that the first CG uplink resource in the COT of the network device cannot be shared with the terminal device for transmitting a CG-PUSCH, not transmit the CG-PUSCH on the first CG uplink resource.

Optionally, in some embodiments, the method includes at least one of the following: the first DCI includes second COT sharing indication information, the second COT sharing indication information being used to determine whether the terminal device is allowed to share the first configured grant (CG) uplink resource in the COT obtained by the network device to transmit the CG-PUSCH; and the first DCI includes slot format indication (SFI) information, the SFI information being used to determine whether the terminal device is allowed to share the first configured grant (CG) uplink resource in the COT obtained by the network device to transmit the CG-PUSCH.

Optionally, in some embodiments, the SFI information being used to determine whether the terminal device is allowed to share the first configured grant (CG) uplink resource in the COT obtained by the network device to transmit the configured grant physical uplink shared channel (CG-PUSCH) includes:

when the slot format indication information in the first DCI indicates that a symbol corresponding to the first CG uplink resource is an uplink symbol, it indicates that the first CG uplink resource in the COT of the network device can be shared with the terminal device for transmitting the first CG-PUSCH; or when the slot format indication information in the first DCI indicates that the symbol corresponding to the first CG uplink resource is not the uplink symbol, it indicates that the first CG uplink resource in the COT of the network device cannot be shared with the terminal device for transmitting the first CG-PUSCH.

Optionally, in some embodiments, the determining module 410 is further configured to:

when the terminal device is configured with the second COT sharing indication information, determine, according to the second COT sharing indication information, whether an uplink resource in the COT of the network device can be shared for uplink transmission; or when the terminal device is not configured with the second COT sharing indication information, determine, according to the SFI indication information, whether the uplink resource in the COT of the network device can be shared for uplink transmission.

Optionally, in some embodiments, the communication module may be a communication interface or a transceiver, or an input/output interface of a communication chip or a system-on-chip. The determining module may be one or more processors.

It should be understood that the terminal device 400 according to the embodiments of the present disclosure may correspond to the terminal device in the method embodiments of the present disclosure, and the above-mentioned and other operations and/or functions of each unit in the terminal device 400 are used to implement the corresponding flows executed by the terminal device in the method in FIG. 4, respectively, which will not be repeated here for the sake of brevity.

Figure 8:
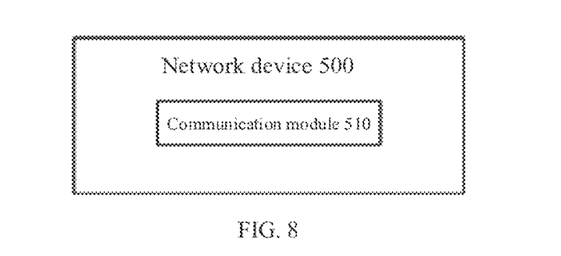
FIG. 8 is a schematic structural diagram of a network device according to one or more embodiments of the present disclosure.

FIG. 8 is a schematic block diagram of a network device according to an embodiment of the present disclosure. The network device 500 of FIG. 8 includes:

a communication module 510, configured to send first downlink control information (DCI) to a terminal device, where the first DCI is used for the terminal device to perform at least one of determining whether an uplink transmission can be performed within a channel occupancy time (COT) obtained by the network device, and determining content of first COT sharing indication information included in configured grant uplink control information (CG-UCI), and the first COT sharing indication information is used to indicate whether a COT obtained by the terminal device can be shared with the network device, and a resource used for the uplink transmission is a configured grant (CG) uplink resource in the COT obtained by the network device.

Optionally, in some embodiments, the communication module 510 is further configured to:

when the first DCI indicates that a first CG uplink resource in the COT of the network device can be shared with the terminal device for transmitting a first CG-PUSCH, receive the first CG-PUSCH transmitted by the terminal device on the first CG uplink resource, where the first CG-PUSCH includes first CG-UCI, and the first COT sharing indication information in the first CG-UCI indicates whether the COT obtained by the terminal device is shared with the network device.

Optionally, in some embodiments, the first COT sharing indication information in the first CG-UCI includes at least one bit, and the at least one bit is used to indicate that the COT obtained by the terminal device cannot be shared with the network device.

Optionally, in some embodiments, when the terminal device is not configured with a sharing energy detection threshold, the first COT sharing indication information includes one bit, and the one bit is set to 0 to indicate that the COT obtained by the terminal device cannot be shared with the network device.

Optionally, in some embodiments, the communication module 510 is further configured to:

when the first DCI indicates that the first CG uplink resource in the COT of the network device cannot be shared with the terminal device for transmitting a CG-PUSCH, not receive the CG-PUSCH on the first CG uplink resource.

Optionally, in some embodiments, the first DCI includes second COT sharing indication information, and the second COT sharing indication information is used to determine whether the terminal device is allowed to share the first configured grant (CG) uplink resource in the COT obtained by the network device to transmit the CG-PUSCH; and/or the first DCI includes slot format indication (SFI) information, and the SFI information is used to determine whether the terminal device is allowed to share the first configured grant (CG) uplink resource in the COT obtained by the network device to transmit the CG-PUSCH.

Optionally, in some embodiments, the SFI information being used to determine whether the terminal device is allowed to share the first configured grant (CG) uplink resource in the COT obtained by the network device to transmit the configured grant physical uplink shared channel (CG-PUSCH) includes:

when the slot format indication information in the first DCI indicates that a symbol corresponding to the first CG uplink resource is an uplink symbol, it indicates that the first CG uplink resource in the COT of the network device can be shared with the terminal device for transmitting the first CG-PUSCH; or when the slot format indication information in the first DCI indicates that the symbol corresponding to the first CG uplink resource is not the uplink symbol, it indicates that the first CG uplink resource in the COT of the network device cannot be shared with the terminal device for transmitting the first CG-PUSCH.

Optionally, in some embodiments, when the second COT sharing indication information is configured for the terminal device by the network device, the second COT sharing indication information is used to determine whether an uplink resource in the COT of the network device can be shared for uplink transmission; or when the second COT sharing indication information is not configured for the terminal device by the network device, the SFI indication information is used to determine whether the uplink resource in the COT of the network device can be shared for uplink transmission.

Optionally, in some embodiments, the communication module may be a communication interface or a transceiver, or an input/output interface of a communication chip or a system-on-chip. The determining module may be one or more processors.

It should be understood that the network device 500 according to the embodiments of the present disclosure may correspond to the terminal device in the method embodiments of the present disclosure, and the above-mentioned and other operations and/or functions of each unit in the network device 500 are used to implement the corresponding flows executed by the network device in the method in FIG. 4, respectively, which will not be repeated here for the sake of brevity.

Figure 9:
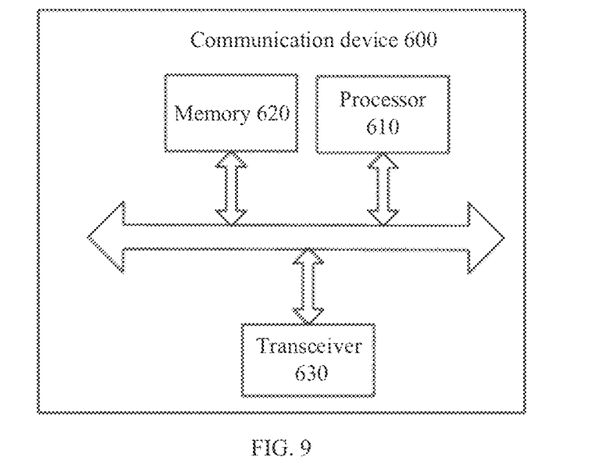
FIG. 9 is a schematic block diagram of a communication device provided by one or more embodiments of the present disclosure.

FIG. 9 is a schematic structural diagram illustrating a communication device 600 according to an embodiment of the present disclosure. The communication device 600 shown in FIG. 9 includes a processor 610. The processor 610 may invoke a computer program from a memory and run the computer program, to implement the method in the embodiments of the present disclosure.

Optionally, as shown in FIG. 9, the communication device 600 may further include a memory 620. The processor 610 may invoke the computer program from the memory 620 and run the computer program, to implement the method in the embodiments of the present disclosure.

The memory 620 may be a component independent of the processor 610, or may be integrated into the processor 610.

Optionally, as shown in FIG. 9, the communication device 600 may further include a transceiver 630. The processor 610 may control the transceiver 630 to communicate with another device, and specifically, controlling the transceiver 630 to transmit information or data to another device, or receive information or data transmitted by another device.

The transceiver 630 may include a transmitter and a receiver. The transceiver 630 may further include an antenna. There may be one or more antennas.

Optionally, the communication device 600 may be specifically the network device in the embodiments of the present disclosure, and the communication device 600 can implement corresponding process implemented by the network device in various methods in the embodiments of the present disclosure. For the sake of brevity, details are not described herein again.

Optionally, the communication device 600 may be specifically the mobile terminal/terminal device in the embodiments of the present disclosure, and the communication device 600 can implement corresponding process implemented by the mobile terminal/terminal device in various methods in the embodiments of the present disclosure. For the sake of brevity, details are not described herein again.

Figure 10:
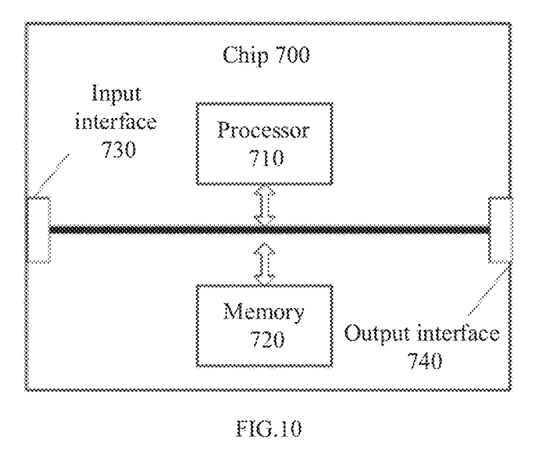
FIG. 10 is a schematic block diagram of a chip provided by one or more embodiments of the present disclosure.

FIG. 10 is a schematic structural diagram of a chip 700 according to an embodiment of the present disclosure. The chip 700 shown in FIG. 7 includes a processor 710 which can call and run a computer program from a memory to implement the methods according to the embodiments of the present disclosure.

Optionally, as shown in FIG. 10, the chip 700 can further include a memory 720. The processor 710 can call and run the computer program from the memory 720 to carry out the methods in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and specifically, to obtain information or data transmitted by other devices or chips.

Optionally, the chip 700 can further include an output interface 740. The processor 710 can control the output interface 740 to communicate with other devices or chips, and specifically, to output information or data to other devices or chips.

Optionally, the chip can be applied to the network device in the embodiments of the application, and the chip can carry out the corresponding processes which are implemented by the network device in the methods according to the embodiments of the present disclosure, which will not be repeated here for the sake of brevity.

Optionally, the chip can be applied to the mobile terminal/ terminal device in the embodiments of the present disclosure, and the chip can carry out the corresponding processes which are implemented by the mobile terminal/terminal device in the methods of the embodiments of the present disclosure, which will not be repeated here for the sake of brevity.

Figure 11:
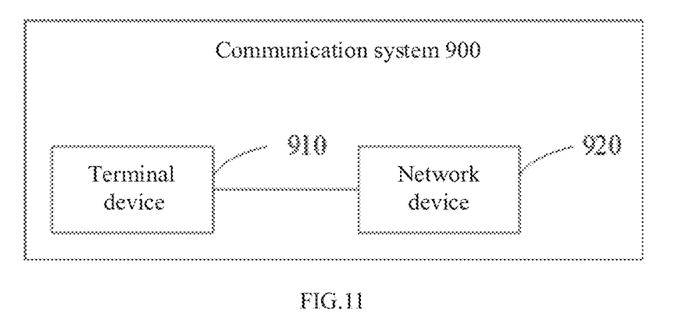
FIG. 11 is a schematic block diagram of a communication system provided by one or more embodiments of the present disclosure.

It should be understood that the chip mentioned in the embodiments of the present disclosure can also be referred to as a system-level chip, a system chip, a chip system, or a system-on-chip FIG. 11 is a schematic block diagram of a communication system 900 provided by an embodiment of the present disclosure. As shown in FIG. 11, the communication system 900 includes a terminal device 910 and a network device 920.

The terminal device 910 can be configured to implement the corresponding functions implemented by the terminal device in the above methods, and the network device 920 can be configured to implement the corresponding functions implemented by the network device in the above methods, which will not be repeated here for the sake of brevity.

It should be understood that the processor according to the embodiments of the present disclosure can be an integrated circuit chip with signal processing capability. In the implementations, the operations of the foregoing method embodiments can be completed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), other programmable logic devices, discrete gate or transistor logic device, or a discrete hardware component, which can implement the methods, operations, and logical blocks disclosed in the embodiments of the present disclosure. The general-purpose processor can be a microprocessor, any conventional processor or the like. The operations of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the operations of the above methods in combination with the hardware thereof.

It can be understood that the memory in the embodiments of the present disclosure may be a volatile memory or a non-volatile memory, or may include both the volatile and non-volatile memories. The non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ES-DRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

An embodiment of the present disclosure also provides a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal device in the embodiments of the present disclosure, and the computer program causes the computer to perform the corresponding processes which are implemented by the mobile terminal/ terminal device in the methods of the embodiments of the present disclosure. For the sake of brevity, a repeated description is omitted here.

An embodiment of the present disclosure also provides a computer program product including computer program instructions.

Optionally, the computer program product can be applied to the network device in the embodiments of the present disclosure, and the computer program instructions cause a computer to perform the corresponding processes implemented by the network device in the methods according to the embodiments of the present disclosure, which will not be repeated here for the sake of brevity.

Optionally, the computer program product can be applied to the mobile terminal/terminal device in the embodiments of the present disclosure, and the computer program instructions cause a computer to perform the corresponding processes which are implemented by the mobile terminal/terminal device in the methods of the embodiments of the present disclosure, which will not be repeated here for the sake of brevity.

An embodiment of the application also provides a computer program.

Optionally, the computer program can be applied to the network device in the embodiments of the present disclosure, and when running on a computer, the computer program causes the computer to perform the corresponding process implemented by the network device in the methods according to the embodiments of the present disclosure, which will not be repeated here for the sake of brevity.

Optionally, the computer program can be applied to the mobile terminal/terminal device in the embodiments of the present disclosure, and when running on a computer, the computer program causes the computer to perform the corresponding processes implemented by the mobile terminal/terminal device in the methods of the embodiments of the present disclosure, which will not be repeated here for the sake of brevity.

With the above technical solutions, the network device can send the first DCI to the terminal device, so that the terminal device can determine, according to the first DCI, whether the uplink transmission can be performed within the channel occupancy time (COT) obtained by the network device, or can indicate to the network device, according to the first DCI, whether the COT obtained by the terminal device can be shared, which is beneficial to improve a utilization rate of the unlicensed spectrum.

Those of ordinary skill in the art can recognize that the exemplary units and algorithm operations described in connection with the embodiments disclosed herein can be implemented in electronic hardware or a combination of computer software and the electronic hardware. Whether these functions are implemented in hardware or in software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for convenience and conciseness of the description, for the specific operating process of the systems, devices and units described above, reference can be made to corresponding processes in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each of the units can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the operations of the wireless communication methods provided by the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A wireless communication method, comprising:
performing, by a terminal device according to first Downlink Control Information (DCI) sent by a network device, at least one of determining whether an uplink transmission is allowed to be performed within a Channel Occupancy Time (COT) obtained by the network device, and determining content of first COT sharing indication information comprised in Configured Grant Uplink Control Information (CG-UCI), wherein the first COT sharing indication information is used to indicate whether a COT obtained by the terminal device is allowed to be shared with the network device, and wherein a resource used for the uplink transmission is a Configured Grant (CG) uplink resource in the COT obtained by the network device;
wherein at least one of the following:
the first DCI comprises second COT sharing indication information, and the second COT sharing indication information is used to determine whether the terminal device is allowed to share a first Configured Grant (CG) uplink resource in the COT obtained by the network device to transmit a Configured Grant Physical Uplink Shared Channel (CG-PUSCH); and the first DCI comprises Slot Format Indication (SFI) information, and the SFI information is used to determine whether the terminal device is allowed to share the first CG uplink resource in the COT obtained by the network device to transmit the CG-PUSCH.

2. The method according to claim 1, wherein the performing, by the terminal device according to the first DCI sent by the network device, at least one of determining whether the uplink transmission is allowed to be performed within the COT obtained by the network device, and determining the content of the first COT sharing indication information comprised in the CG-UCI comprises:

when the first DCI indicates that a first CG uplink resource in the COT of the network device is allowed to be shared with the terminal device for transmitting a first CG-PUSCH, performing, by the terminal device, at least one of the following:

transmitting, by the terminal device, the first CG-PUSCH on the first CG uplink resource, wherein the first CG-PUSCH comprises first CG-UCI, and the first COT sharing indication information in the first CG-UCI indicates that the COT obtained by the terminal device is not allowed to be shared with the network device;

transmitting, by the terminal device, the first CG-PUSCH on the first CG uplink resource, wherein the first CG-PUSCH comprises the first CG-UCI, and the first CG-UCI does not comprise the first COT sharing indication information, indicating that the COT obtained by the terminal device is not allowed to be shared with the network device;

transmitting, by the terminal device, the first CG-PUSCH on the first CG uplink resource, wherein the COT obtained by the terminal device is not allowed to be shared with the network device;

when the terminal device is configured with a sharing energy detection threshold, transmitting, by the terminal device, the first CG-PUSCH on the first CG uplink resource, wherein the first CG-PUSCH comprises the first CG-UCI, the first COT sharing indication information in the first CG-UCI indicates that the COT obtained by the terminal device is not allowed to be shared with the network device, and the first COT sharing indication information comprises at least one bit; and when the terminal device is not configured with the sharing energy detection threshold, transmitting, by the terminal device, the first CG-PUSCH on the first CG uplink resource, wherein the first CG-PUSCH comprises the first CG-UCI, the first COT sharing indication information in the first CG-UCI indicates that the COT obtained by the terminal device is not allowed to be shared with the network device, and the first COT sharing indication information comprises one bit.

3. The method according to claim 2, wherein the first COT sharing indication information in the first CG-UCI comprises at least one bit, and all of the at least one bit being of a value of 0 indicates that the COT obtained by the terminal device is not allowed to be shared with the network device.

4. The method according to claim 2, wherein when the terminal device is not configured with the sharing energy detection threshold, the first COT sharing indication information comprises one bit, and the one bit is set to 0.

5. The method according to claim 1, wherein the performing, by the terminal device according to the first DCI sent by the network device, at least one of determining whether the uplink transmission is allowed to be performed within the COT obtained by the network device, and determining the content of the first COT sharing indication information comprised in the CG-UCI comprises:

when the first DCI indicates that the first CG uplink resource in the COT of the network device is not allowed to be shared with the terminal device for transmission of a CG-PUSCH, not transmitting, by the terminal device, the CG-PUSCH on the first CG uplink resource.

6. The method according to claim 1, wherein the SFI information being used to determine whether the terminal device is allowed to share the first CG uplink resource in the COT obtained by the network device to transmit the CG-PUSCH comprises:

when the SFI information in the first DCI indicates that a symbol corresponding to the first CG uplink resource is an uplink symbol, it indicates that the first CG uplink resource in the COT of the network device is allowed to be shared with the terminal device for transmission of a first CG-PUSCH of the CG-PUSCH.

7. The method according to claim 1, wherein the SFI information being used to determine whether the terminal device is allowed to share the first CG uplink resource in the COT obtained by the network device to transmit the CG-PUSCH comprises:

when the SFI information in the first DCI indicates that a symbol corresponding to the first CG uplink resource is not an uplink symbol, it indicates that the first CG uplink resource in the COT of the network device is not allowed to be shared with the terminal device for transmission of the first CG-PUSCH.

8. The method according to claim 1, wherein, when the terminal device is configured with the second COT sharing indication information, it is determined, according to the second COT sharing indication information, whether an uplink resource in the COT of the network device is allowed to be shared for uplink transmission; or when the terminal device is not configured with the second COT sharing indication information, it is determined, according to the SFI indication information, whether the uplink resource in the COT of the network device is allowed to be shared for the uplink transmission.

9. A wireless communication method, comprising:

sending, by a network device, first Downlink Control Information (DCI) to a terminal device, wherein the first DCI is used for the terminal device to perform at least one of determining whether an uplink transmission is allowed to be performed within a Channel Occupancy Time (COT) obtained by the network device, and determining content of first COT sharing indication information comprised in Configured Grant Uplink Control Information (CG-UCI), wherein the first COT sharing indication information is used to indicate whether a COT obtained by the terminal device is allowed to be shared with the network device, and wherein a resource used for the uplink transmission is a Configured Grant (CG) uplink resource in the COT obtained by the network device, wherein at least one of the following:

the first DCI comprises second COT sharing indication information, and the second COT sharing indication information is used to determine whether the terminal device is allowed to share the first Configured Grant (CG) uplink resource in the COT obtained by the network device to transmit a Configured Grant Physical Uplink Shared Channel (CG-PUSCH); and the first DCI comprises Slot Format Indication (SFI) information, and the SFI information is used to determine whether the terminal device is allowed to share the first CG uplink resource in the COT obtained by the network device to transmit the CG-PUSCH.

10. The method according to claim 9, further comprising:
when the first DCI indicates that the first CG uplink resource in the COT of the network device is allowed to be shared with the terminal device for transmission of a first CG-PUSCH, receiving, by the network device, the first CG-PUSCH transmitted by the terminal device on the first CG uplink resource, wherein the first CG-PUSCH comprises first CG-UCI, and the first COT sharing indication information in the first CG-UCI is used to indicate whether the COT obtained by the terminal device is allowed to be shared with the network device.

11. The method according to claim 10, wherein the first COT sharing indication information in the first CG-UCI comprises at least one bit, and the at least one bit is used to indicate that the COT obtained by the terminal device is not allowed to be shared with the network device.

12. The method according to claim 10, wherein when the terminal device is not configured with a sharing energy detection threshold, the first COT sharing indication information comprises one bit, and the one bit is set to 0 to indicate that the COT obtained by the terminal device is not allowed to be shared with the network device.

13. The method according to claim 9, further comprising:
when the first DCI indicates that the first CG uplink resource in the COT of the network device is not allowed to be shared with the terminal device for transmission of a CG-PUSCH, not receiving, by the network device, the CG-PUSCH on the first CG uplink resource.

14. The method according to claim 9, wherein the SFI information being used to determine whether the terminal device is allowed to share the first CG uplink resource in the COT obtained by the network device to transmit the CG-PUSCH comprises:
when the slot format indication information in the first DCI indicates that a symbol corresponding to the first CG uplink resource is an uplink symbol, it indicates that the first CG uplink resource in the COT of the network device is allowed to be shared with the terminal device for transmission of the first CG-PUSCH.

15. The method according to claim 9, wherein the SFI information being used to determine whether the terminal device is allowed to share the first Configured Grant (CG) uplink resource in the COT obtained by the network device to transmit the CG-PUSCH comprises:
when the slot format indication information in the first DCI indicates that a symbol corresponding to the first CG uplink resource is not an uplink symbol, it indicates that the first CG uplink resource in the COT of the network device is not allowed to be shared with the terminal device for transmission of the first CG-PUSCH.

16. The method according to claim 9, further comprising:
when the second COT sharing indication information is configured for the terminal device by the network device, the second COT sharing indication information is used to determine whether an uplink resource in the COT of the network device is allowed to be shared for uplink transmission; or when the second COT sharing indication information is not configured for the terminal device by the network device, the SFI indication information is used to determine whether the uplink resource in the COT of the network device is allowed to be shared for the uplink transmission.

17. A terminal device, comprising:
a processor and a memory, wherein memory is configured to store a computer program, and the processor is configured to call and run the computer program stored in the memory to perform operations of:

performing, according to first Downlink Control Information (DCI) sent by a network device, at least one of determining whether an uplink transmission is allowed to be performed within a Channel Occupancy Time (COT) obtained by the network device, and determining content of first COT sharing indication information comprised in Configured Grant Uplink Control Information (CG-UCI), wherein the first COT sharing indication information is used to indicate whether a COT obtained by the terminal device is allowed to be shared with the network device, and wherein a resource used for the uplink transmission is a Configured Grant (CG) uplink resource in the COT obtained by the network device, wherein at least one of the following:
the first DCI comprises second COT sharing indication information, and the second COT sharing indication information is used to determine whether the terminal device is allowed to share a first Configured Grant (CG) uplink resource in the COT obtained by the network device to transmit a Configured Grant Physical Uplink Shared Channel (CG-PUSCH); and the first DCI comprises Slot Format Indication (SFI) information, and the SFI information is used to determine whether the terminal device is allowed to share the first CG uplink resource in the COT obtained by the network device to transmit the CG-PUSCH.

* * * * *